United States Patent
Backhouse et al.

(10) Patent No.: US 9,545,896 B2
(45) Date of Patent: Jan. 17, 2017

(54) MOTOR VEHICLE SAFETY ARRANGEMENT AND METHOD

(71) Applicant: VOLVO CAR CORPORATION, Gothenburg (SE)

(72) Inventors: Andrew Backhouse, Gothenburg (SE); David Madas, Gothenburg (SE)

(73) Assignee: VOLVO CAR CORPORATION (SE)

( * ) Notice: Subject to any disclaimer, the term of this patent is extended or adjusted under 35 U.S.C. 154(b) by 36 days.

(21) Appl. No.: 14/154,491

(22) Filed: Jan. 14, 2014

(65) Prior Publication Data

US 2014/0207339 A1    Jul. 24, 2014

(30) Foreign Application Priority Data

Jan. 21, 2013   (EP) ..................................... 13151989

(51) Int. Cl.
    B60R 22/48      (2006.01)
    B60R 21/0134    (2006.01)

(52) U.S. Cl.
    CPC ........... B60R 22/48 (2013.01); B60R 21/0134 (2013.01)

(58) Field of Classification Search
    CPC ............................ B60R 22/48; B60R 21/0134
    See application file for complete search history.

(56) References Cited

U.S. PATENT DOCUMENTS

| 6,758,495 B2 | 7/2004 | Brambilla et al. |
| 2002/0105416 A1 | 8/2002 | Kore |
| 2008/0306658 A1* | 12/2008 | Beisheim ............ B60R 21/013 701/46 |
| 2013/0131928 A1* | 5/2013 | Bolton ........................ 701/45 |

FOREIGN PATENT DOCUMENTS

| EP | 1783007 A1 | 5/2007 |
| JP | 2008120228 A | 5/2008 |
| WO | 2008002756 A2 | 1/2008 |

OTHER PUBLICATIONS

Extended European Search Report Dated Dec. 12, 2013, Application No. 13151989.4-1803, Applicant Volvo Car Corporation, 6 Pages.

* cited by examiner

Primary Examiner — Basil T Jos
(74) Attorney, Agent, or Firm — Brooks Kushman P.C.

(57) ABSTRACT

Embodiments herein relate to a motor vehicle safety arrangement and method for positioning an occupant properly on a vehicle seat and restraining the occupant thus positioned in preparation of the vehicle potentially being subject to a rear-end collision. A safety belt is associated with the vehicle seat and an electric reversible safety belt retractor is associated with the safety belt. A rearward-looking detection system detects and classifies the collision risk for an approaching object. At least one sensor monitors one or more vehicle parameters. A control unit determines a driving state as critical or non-critical from the monitored vehicle parameters. The control unit controls the electric reversible safety belt retractor to apply a predetermined pullback force on the safety belt in response to the collision risk for an approaching object being classified as high within a predetermined time of an indicated critical driving state.

20 Claims, 3 Drawing Sheets

MOTOR VEHICLE SAFETY ARRANGEMENT AND METHOD

CROSS-REFERENCE TO RELATED APPLICATIONS

This application claims foreign priority benefits under 35 U.S.C. §119(a)-(d) to European patent application number EP 13151989.4, filed Jan. 21, 2013, which is incorporated by reference in its entirety.

TECHNICAL FIELD

Embodiments herein relate to a motor vehicle safety arrangement for positioning an occupant properly relative to a back rest of a vehicle seat and restraining the occupant thus positioned on the vehicle seat in preparation of the vehicle potentially being subject to a rear-end collision.

Further embodiments herein relate to a method for positioning a vehicle occupant properly relative to a back rest of a vehicle seat and restraining the occupant thus positioned on the vehicle seat in preparation of the vehicle potentially being subject to a rear-end collision.

Still further embodiments herein relate to a motor vehicle comprising a motor vehicle safety arrangement for positioning an occupant properly relative to a back rest of a vehicle seat and restraining the occupant thus positioned on the vehicle seat in preparation of the vehicle potentially being subject to a rear-end collision.

BACKGROUND

In motor vehicles, collision warning systems are becoming more widely used. Collision warning systems provide a vehicle operator knowledge and awareness of objects or vehicles within a close proximity, so as to prevent colliding with those objects. Current collision warning systems usually rely on a sensor located on the vehicle which, upon sensing an object generates an object detection signal, which is communicated to the operator of that vehicle as a warning of a potential collision.

One class of such collision warning system is a rear-end collision warning system. Rear-end collisions may cause so called whiplash injuries to occupants of the vehicle being rear-ended. Thus, there exist today systems for preventing or mitigating whiplash related injuries during rear-end collisions. Such systems usually rely on electric reversible seat-belt retractors or tensioners. One such system is known through WO2008002756, which relates to a control system for warning a following vehicle of a potential collision with a leading vehicle.

In WO2008002756 the leading vehicle is equipped with a rear collision warning system that can determine the range and range rate of the following vehicle using radar sensors or ultrasonic sensors. The control system employs an algorithm that detects the following vehicle and determines whether the potential exists for a collision with the leading vehicle. The algorithm compares a desired distance between the leading vehicle and the following vehicle based on the speed of the leading vehicle, and determines whether the difference between the desired distance and the actual distance is greater than a predetermined threshold. If the difference is greater than the threshold, the algorithm may provide one or more operations, such as flashing hazard lights to warn the following vehicle, or taking other courses of action in the event of an imminent collision, such as pre-tensioning seat belts.

However, it is a well-known fact that many vehicle drivers have a quite aggressive style of driving. Such aggressive driving increases the number of instances when a driver comes close to a rear-end collision. Known systems, as e.g., the system known through WO2008002756, may therefore falsely classify these instances as instances where a collision is imminent.

As a consequence thereof known systems equipped with electric reversible seat-belt retractors or tensioners therefore are often set to activate the retractors or tensioners at a very late instance prior to a rear-end collision, in order to avoid a too frequent activation thereof which may cause a disturbance and be perceived as annoying by vehicle occupants.

However, rear-end collisions between two moving vehicles often occur very rapidly, such that late activation may provide for an insufficient amount of time for such known systems to be able to fully accomplish appropriate positioning of a vehicle occupant in order to effect adequate protection against injuries, such as e.g., whiplash injuries.

Several attempts have been made to ensure that instances of non-threatening driving are not falsely classified as instances where a collision is imminent. One such attempt is illustrated by U.S. Pat. No. 6,758,495, which relates to a method and system for restraining an occupant on a vehicle seat, the occupant being pulled into the vehicle seat is provided with a force by a belt tensioner when a critical driving state is detected and then held in a pulled-back position on the vehicle seat with a holding force. A forward-looking detection system for a dangerous driving state is provided, in which, when a dangerous driving state is detected, a belt tensioner is subjected to a force and the occupant is thereby pulled into the vehicle seat, and in which the occupant is held in a pulled-back position on the vehicle seat.

According to U.S. Pat. No. 6,758,495 a trigger criterion for belt tensioners can thus be derived by determining critical driving situations and/or with the aid of the forward-looking sensor system. The critical vehicle state is detected by monitoring the steering angle, distance from an object, relative velocity, vehicle deceleration, yaw angle, yaw rate, yawing acceleration, vehicle's own speed, steering angle, sharp changes in direction, jump in the road/tire friction coefficient, lateral acceleration, wheel speed and/or angle of inclination or any combination of these parameters. Using the distance from the object, the relative velocity, vehicle's own speed, vehicle deceleration or even the friction coefficient as parameters, for example, a time of collision is determined from this, i.e. the time the electrical reversible belt tensioner has to spare before the time of collision. All the data from detection devices and calculation units or any combination of these data are fed to a control unit, which then compares them with predetermined limiting values and triggers the reversible belt tensioner if these values are exceeded.

Although the method and system suggested by U.S. Pat. No. 6,758,495 may provide for improved classification of driving instances as non-threatening or threatening, there is no provision for ensuring an allowance of a sufficient amount of time to be able to fully accomplish appropriate positioning of a vehicle occupant in order to effect adequate protection against whiplash injuries.

SUMMARY

Embodiments herein aim to provide an improved motor vehicle safety arrangement for positioning an occupant properly relative to a back rest of a vehicle seat and restraining the occupant thus positioned on the vehicle seat in preparation of the vehicle potentially being subject to a rear-end collision, the vehicle having a safety belt associated with the vehicle seat and an electric reversible safety belt retractor associated with the safety belt.

This is provided through a motor vehicle safety arrangement which comprises: a rearward-looking detection system for detecting and classifying the collision risk for an approaching object; at least one sensor for monitoring one or more vehicle parameters; a control unit arranged to determine a driving state as critical or non-critical from the monitored vehicle parameters; and; where the control unit further is operable to control the electric reversible safety belt retractor to apply a predetermined pullback force on the safety belt to pull an occupant into the vehicle seat in response to the collision risk for an approaching object being classified as high within a predetermined time of an indicated critical driving state.

The provision a motor vehicle safety arrangement as above, performing belt retraction in response to the collision risk for an approaching object being classified as high within a predetermined time of an indicated critical driving state provides for taking into account driver behavior, such that the number of non-threatening instances being classified as instances where a collision is imminent can be reduced.

According to a second aspect at least one sensor is arranged to monitor at least one of the following vehicle parameters: vehicle velocity, steering wheel angle, vehicle yaw rate, yawing acceleration, lateral acceleration, angle of inclination and wheel speeds.

The provision of monitoring these vehicle parameters facilitates cost efficient realization of the arrangement as a plurality of these sensors are normally already present in today's vehicles.

According to a third aspect the control unit is arranged to determine critical driving from the monitored vehicle parameters when one or more of the vehicle parameters indicate: a low wheel to road friction coefficient, significant vehicle deceleration, vehicle lane change or strong vehicle turning.

The provision of determining critical driving in this way also facilitates cost efficient realization of the arrangement as determination can be made from vehicle parameters obtained using sensors that are normally already present in today's vehicles.

According to a fourth aspect the control unit is arranged to determine a low wheel to road friction coefficient based on at least differences in the monitored wheel speeds.

The provision of determining a low wheel to road friction coefficient in this way also facilitates cost efficient realization of the arrangement as determination can be made from vehicle parameters obtained using wheel speed sensors that are normally already present in today's vehicles.

According to a fifth aspect the control unit is arranged to determine significant vehicle deceleration based on at least a reduction of the monitored vehicle velocity exceeding a predetermined threshold during a predetermined time interval.

Determining significant vehicle deceleration in this way is simple and cost efficient as determination can be made from vehicle parameters obtained using sensors that are normally already present in today's vehicles.

According to a sixth aspect the control unit is arranged to determine vehicle lane change or strong vehicle turning based on at least one of the monitored steering wheel angle and vehicle yaw rate exceeding predetermined thresholds.

Determining vehicle lane change or strong vehicle turning in this way is simple and cost efficient as determination can be made from vehicle parameters obtained using sensors that are normally already present in today's vehicles.

According to a seventh aspect the rearward-looking detection system comprises one or more of a radar sensor, a laser sensor, a lidar sensor, an ultrasound sensor, an infrared sensor, an image sensor, or any combination thereof.

The provision of a rearward-looking detection system of this kind provides for reliable detection of objects approaching the vehicle from behind.

According to an eight aspect the rearward-looking detection system is arranged to estimate a time to collision and classify the collision risk for an approaching object as high when the estimated time to collision falls below a predetermined threshold.

Estimating a time to collision and performing classification based on a predetermined threshold for this time to collision provides for a simple and reliable classification of the collision risk for an approaching object.

According to a ninth aspect is further provided a method for positioning a vehicle occupant properly relative to a back rest of a vehicle seat and restraining the occupant thus positioned on the vehicle seat in preparation of the vehicle potentially being subject to a rear-end collision, the vehicle having a safety belt associated with the vehicle seat and an electric reversible safety belt retractor associated with the safety belt, where the method comprises the steps of: detecting and classifying the collision risk for an approaching object using a rearward-looking detection system; monitoring one or more vehicle parameters using at least one sensor; determining a driving state as critical or non-critical from the monitored vehicle parameters using a control unit; and controlling the electric reversible safety belt retractor to apply a predetermined pullback force on the safety belt to pull an occupant into the vehicle seat in response to the collision risk for an approaching object being classified as high within a predetermined time of an indicated critical driving state using the control unit.

The provision of a method for positioning a vehicle occupant as above provides for reducing the number of non-threatening instances being classified as instances where a collision is imminent.

According to a tenth aspect a motor vehicle is provided which comprises a motor vehicle safety arrangement as described herein.

A motor vehicle comprising a motor vehicle safety arrangement as described herein will provide improved safety for vehicle occupants as through ensuring an allowance of a sufficient amount of time to be able to fully accomplish appropriate positioning of a vehicle occupant in order to affect adequate protection against whiplash injuries should the vehicle be at high risk of being subject to a rear-end collision.

BRIEF DESCRIPTION OF THE DRAWINGS

In the following, embodiments herein will be described in greater detail by way of example only with reference to attached drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
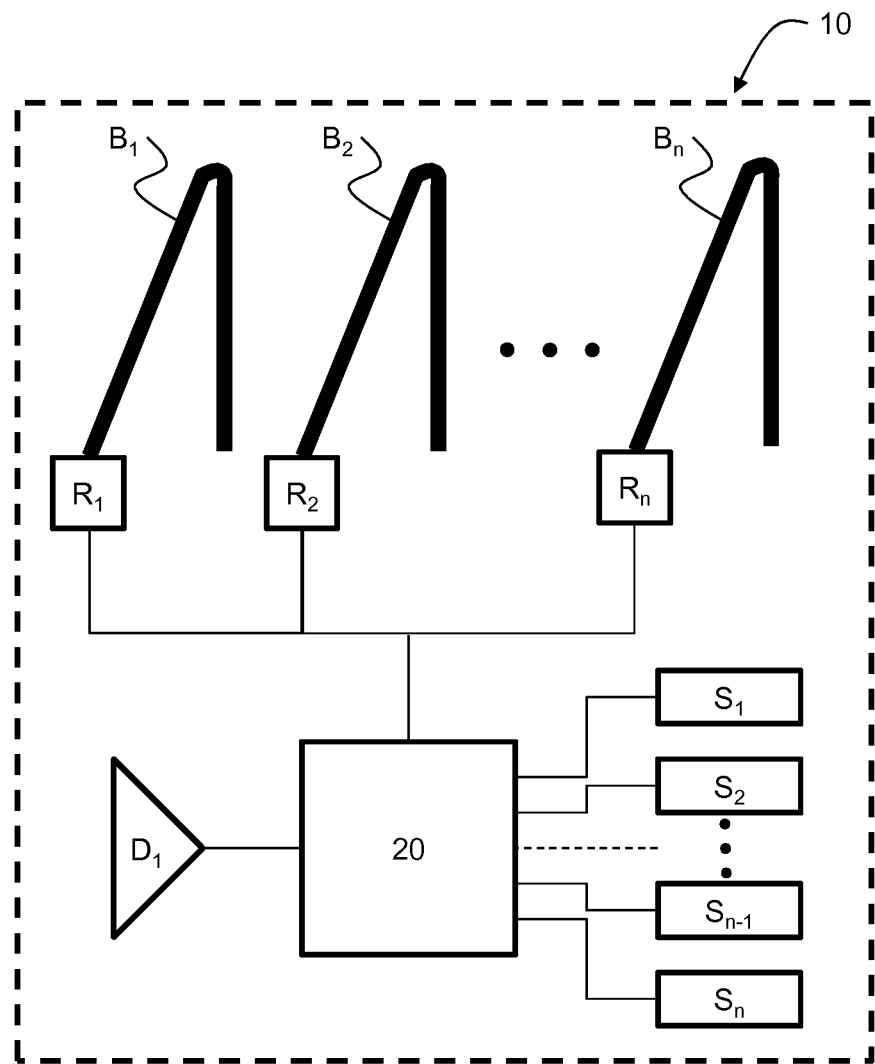
FIG. 1 is a schematic illustration of motor vehicle safety arrangement according to embodiments hereof.

In overview, embodiments herein relate to a motor vehicle 30 safety arrangement 10, as schematically illustrated in FIG. 1. The motor vehicle 30 safety arrangement 10 is provided for positioning a vehicle occupant properly relative to a back rest of a vehicle seat and restraining the vehicle occupant thus positioned on the vehicle seat in preparation of the vehicle 30 potentially being subject to a rear-end collision.

The motor vehicle 30 has a respective safety belt $B_1, B_2 \ldots B_n$ associated with each respective vehicle seat. A respective electric reversible safety belt retractor $R_1, R_2 \ldots R_n$ is associated with each respective safety belt $B_1, B_2 \ldots B_n$.

The motor vehicle 30 safety arrangement 10 comprises a rearward-looking detection system $D_1$. The rearward-looking detection system $D_1$ is provided for detecting and classifying the collision risk for an approaching object, such as a vehicle approaching the motor vehicle 30 hosting the safety arrangement 10 from behind. The rearward-looking detection system $D_1$ suitably comprises processing means (not shown) arranged to perform the collision risk classification.

In some embodiments hereof the rearward-looking detection system $D_1$ comprises one or more of a Radio Detection And Ranging (RADAR) sensor, a Light Detection And Ranging (LIDAR) sensor, a Light Amplification by Stimulated Emission of Radiation (LASER) sensor, an ultrasound sensor, an infrared sensor, an image sensor, or any combination thereof. The image sensor may be a video sensor, designed as either a Charge-Coupled Device (CCD) camera or a Complementary Metal-Oxide Semiconductor (CMOS) camera, for example.

In further embodiments hereof the rearward-looking detection system $D_1$ is arranged to estimate a time to collision and classify the collision risk for an approaching object as high when the estimated time to collision falls below a predetermined threshold.

The safety arrangement 10 further comprises at least one sensor $S_1, S_2 \ldots S_n$, for monitoring one or more vehicle parameters. In embodiments hereof the at least one sensor $S_1, S_2 \ldots S_n$ is arranged to monitor at least one of the following vehicle parameters: vehicle velocity, steering wheel angle, vehicle yaw rate, yawing acceleration, lateral acceleration, angle of inclination and wheel speeds. The person skilled in the art will immediately recognize that determination of one or more of the above vehicle parameters can be made using sensors that are normally already present in today's vehicles. Thus, the safety arrangement 10 may re-use sensors already present for simplicity and cost efficiency.

A control unit 20 is also comprised in the safety arrangement 10. The control unit 20 suitably comprises a processing unit, such as a computer processor, and appropriate software for controlling operation thereof. This control unit 20 is arranged to determine a driving state as critical or non-critical from the monitored vehicle parameters. In embodiments hereof the control unit 20 is arranged to determine critical driving from the monitored vehicle parameters when one or more of the vehicle parameters indicate: a low wheel to road friction coefficient, significant vehicle deceleration, vehicle lane change or strong vehicle turning.

In this way it is possible to position a vehicle occupant properly immediately after a high-risk maneuver has been performed and there exists a threat of suffering a rear end collision. Thus, if either low wheel to road friction, significant vehicle deceleration, vehicle lane change or right or left turn is detected within the last T seconds and an object, e.g., a second vehicle, is detected which is approaching from the rear and has a Time to Collision of less than Z seconds, then the electrical reversible retractors $R_1, R_2 \ldots R_n$ are activated to position the passengers of the vehicle 30 in preparation of the vehicle 30 potentially being hit from behind.

In some embodiments hereof the control unit 20 is arranged to determine a low wheel to road friction based on at least differences in the monitored wheel speeds.

In yet further embodiments hereof the control unit 20 is arranged to determine significant vehicle deceleration based on at least a reduction of the monitored vehicle velocity exceeding a predetermined threshold during a predetermined time interval. This may e.g., be performed through the computer processor being arranged to continuously monitor the vehicle speed. If the vehicle speed reduces by more than X meters per second within a time interval of Y seconds, then a significant vehicle deceleration is detected.

In still further embodiments hereof the control unit 20 is arranged to determine vehicle lane change or strong vehicle turning based on at least one of the monitored steering wheel angle and vehicle yaw rate exceeding predetermined thresholds.

The control unit 20 is further operable to control each electric reversible safety belt refractor $R_1, R_2 \ldots R_n$ to apply a predetermined pullback force on each respective associated safety belt $B_1, B_2 \ldots B_n$, in order to pull an occupant into the vehicle seat in response to the collision risk for an approaching object being classified as high within a predetermined time of an indicated critical driving state.

Figure 2:
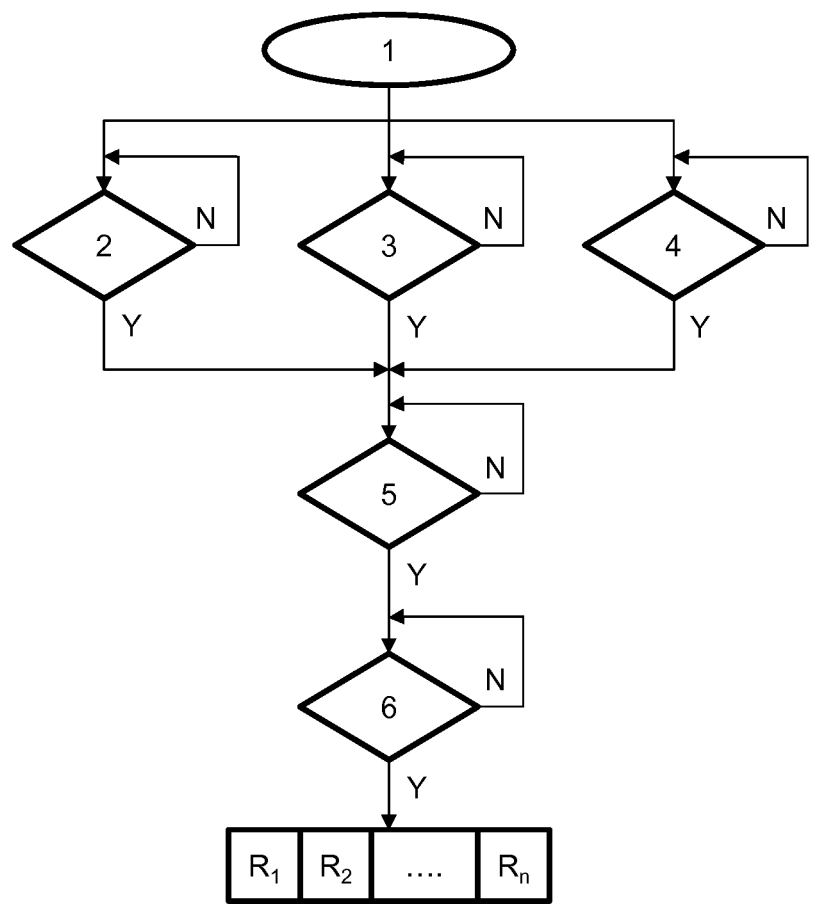
FIG. 2 is a schematic illustration of a method for positioning a vehicle occupant properly relative to a back rest of a vehicle seat and restraining the occupant thus positioned according to embodiments hereof.
Figure 3:
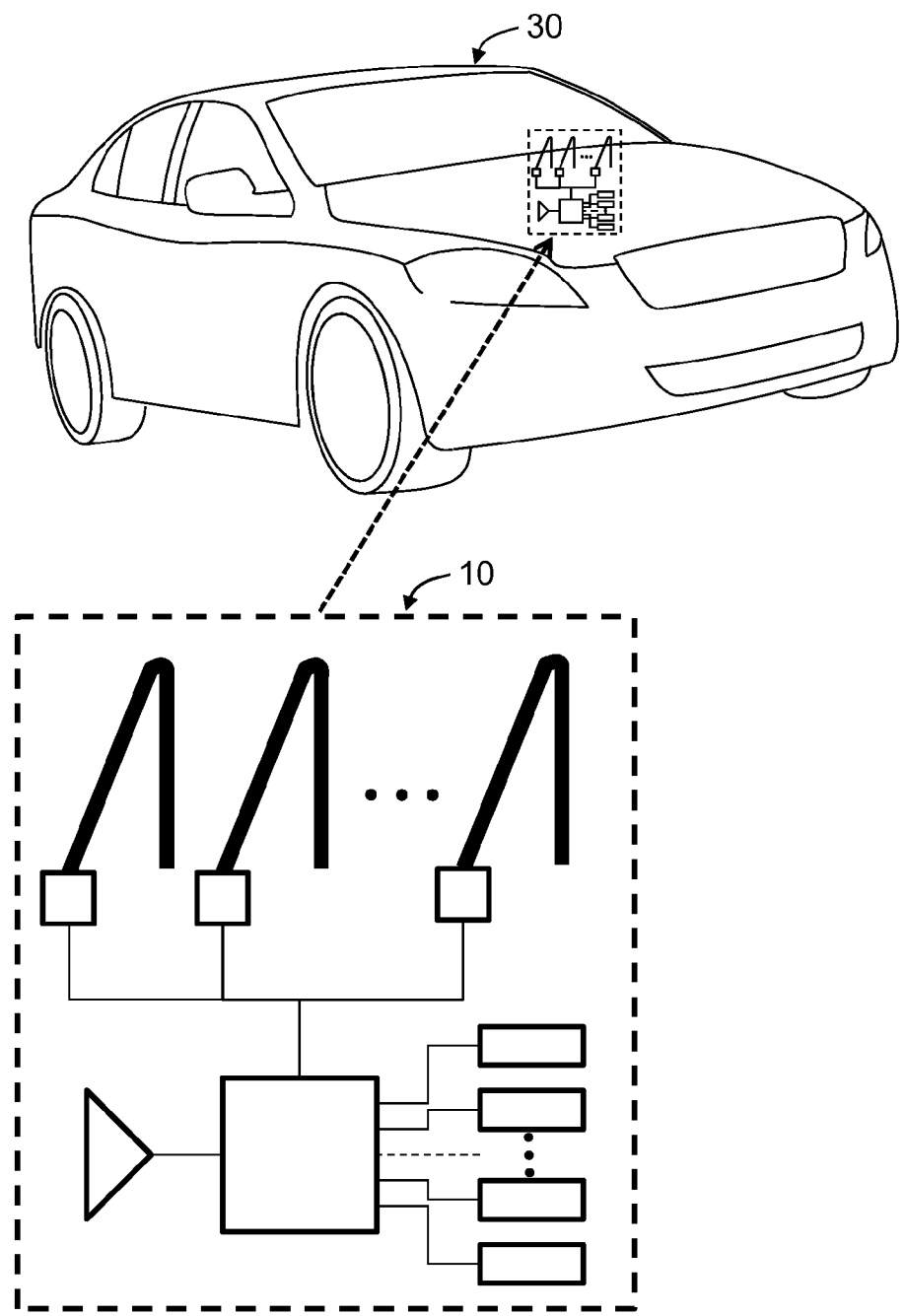
FIG. 3 is a schematic illustration of a motor vehicle comprising a motor vehicle safety arrangement according to embodiments hereof.

A schematic illustration of a method for positioning a vehicle 30 occupant properly relative to a back rest of a vehicle seat and restraining the occupant thus positioned on the vehicle seat in preparation of the vehicle 30 potentially being subject to a rear-end collision is schematically illustrated in FIG. 2.

The method is applicable to a vehicle 30 having a respective safety belt $B_1, B_2 \ldots B_n$ associated with a respective vehicle seat and a respective electric reversible safety belt refractor $R_1, R_2 \ldots R_n$ associated with each respective safety belt $B_1, B_2 \ldots B_n$.

In accordance with the proposed method for positioning a vehicle 30 occupant the method is initiated as a first step 1.

Once up and running the method comprises steps 2, 3, 4 of monitoring one or more vehicle parameters using at least one sensor $S_1, S_2 \ldots S_n$.

For simplicity, FIG. 2 illustrates an embodiment where in step 2 it is decided if a low wheel to road friction coefficient is present, in step 3 it is decided if significant vehicle deceleration has occurred and in step 4 it is decided if vehicle lane change or strong vehicle turning has occurred, where all of the above are decided from the monitored vehicle parameters.

In embodiments hereof the method comprises arranging the at least one sensor $S_1, S_2 \ldots S_n$ to monitor at least one of the following vehicle parameters: vehicle velocity, steering wheel angle, vehicle yaw rate, yawing acceleration, lateral acceleration, angle of inclination and wheel speeds.

A step 5 of detecting and classifying the collision risk for an approaching object is performed using a rearward-looking detection system $D_1$. In embodiments hereof the method comprises arranging to the rearward-looking detection system $D_1$ one or more of a radar sensor, a laser sensor, a lidar sensor, an ultrasound sensor, an infrared sensor, an image sensor, or any combination thereof.

In embodiments hereof the method further comprises arranging the rearward-looking detection system $D_1$ to estimate a time to collision and classify the collision risk for an approaching object as high when the estimated time to collision falls below a predetermined threshold.

A further step 6 of determining a driving state as critical or non-critical from the monitored vehicle parameters and controlling the electric reversible safety belt retractor $R_1, R_2 \ldots R_n$ to apply a predetermined pullback force on the safety belt $B_1, B_2 \ldots B_n$ to pull an occupant into the vehicle seat in response to the collision risk for an approaching object being classified as high within a predetermined time of an indicated critical driving state is performed using a control unit 20.

In some embodiments the method further comprises arranging the control unit 20 to determine critical driving from the monitored vehicle parameters when one or more of the vehicle parameters indicate: a low wheel to road friction coefficient, significant vehicle deceleration, vehicle lane change or strong vehicle turning.

In further embodiments the method also comprises arranging the control unit 20 to determine a low wheel to road friction coefficient based on at least differences in the monitored wheel speeds.

Also, in some embodiments the method further comprises arranging the control unit 20 to determine significant vehicle deceleration based on at least a reduction of the monitored vehicle velocity exceeding a predetermined threshold during a predetermined time interval.

In yet some embodiments the method further comprises arranging the control unit 20 to determine vehicle lane change or strong vehicle turning based on at least one of the monitored steering wheel angle and vehicle yaw rate exceeding predetermined thresholds.

According to the present application is also envisaged a motor vehicle 30 that comprises a motor vehicle safety arrangement 10 as described herein.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A safety arrangement for a motor vehicle for positioning an occupant properly relative to a back rest of a vehicle seat and restraining the occupant thus positioned on the vehicle seat in preparation of the vehicle potentially being subject to a rear-end collision, wherein the vehicle includes a safety belt associated with the vehicle seat and an electric reversible safety belt retractor associated with the safety belt, the safety arrangement comprising:
   a rearward-looking detection system for detecting and classifying collision risk for an approaching object;
   at least one sensor for monitoring one or more vehicle parameters; and
   a control unit for determining a driving state as critical or non-critical from the one or more monitored vehicle parameters independent of the collision risk, wherein the control unit is operable to control the electric reversible safety belt retractor to apply a predetermined pullback force on the safety belt to pull the occupant into the vehicle seat in response to the collision risk for an approaching object being classified as high within a predetermined time of an indicated critical driving state.

2. The safety arrangement according to claim 1 wherein the at least one sensor is arrangeable to monitor at least one of the following vehicle parameters: vehicle velocity, steering wheel angle, vehicle yaw rate, yawing acceleration, lateral acceleration, angle of inclination or wheel speeds.

3. The safety arrangement according to claim 2 wherein the control unit is operable to determine critical driving from the one or more monitored vehicle parameters when the one or more monitored vehicle parameters indicate: a low wheel to road friction coefficient, significant vehicle deceleration, vehicle lane change or strong vehicle turning.

4. The safety arrangement according to claim 3 wherein the control unit is operable to determine a low wheel to road friction coefficient based on at least differences in monitored wheel speeds.

5. The safety arrangement according to claim 3 wherein the control unit is operable to determine significant vehicle deceleration based on at least a reduction of monitored vehicle velocity exceeding a predetermined threshold during predetermined time interval.

6. The safety arrangement claim 3 wherein the control unit is operable to determine vehicle lane change or strong vehicle turning based on at east one of monitored steering wheel angle and vehicle yaw rate exceeding a predetermined threshold.

7. The safety arrangement according to claim 1 wherein the rearward-looking detection system comprises one or more of a radar sensor, a laser sensor, a lidar sensor, ultrasound sensor, an infrared sensor, an image sensor, or any combination thereof.

8. The safety arrangement according to claim 1 wherein the rearward-looking detection system is operable to estimate a time to collision and classify the collision risk for an approaching object as high when the estimated time to collision falls below a predetermined threshold.

9. A motor vehicle comprising:
   a vehicle seat;
   a safety belt associated with the vehicle seat;
   an electric reversible safety belt retractor associated with the safety belt; and
   a safety arrangement according to claim 1.

10. The safety arrangement according to claim 1 wherein the control unit is configured to determine the driving state as critical based on low wheel to road friction, significant vehicle deceleration, vehicle lane change, or strong vehicle turning.

11. The safety arrangement according to claim 1 wherein the rearward-looking detection system is configured to estimate a time to collision and classify the collision risk for an approaching object as high when the estimated time to collision falls below a predetermined threshold, wherein the control unit is configured to determine the driving state as critical based on low wheel to road friction, significant vehicle deceleration, vehicle lane change, or strong vehicle turning, and wherein the control unit is operable to control the electric reversible safety belt retractor to apply the predetermined pullback force on the safety belt to pull the occupant into the vehicle seat so as to properly position the occupant relative to the back rest of the vehicle seat after a high-risk maneuver has been performed and there exists a high risk of suffering a rear end collision.

12. A method for positioning an occupant of a vehicle properly relative to a back rest of a vehicle seat and restraining the occupant thus positioned on the vehicle seat in preparation of the vehicle potentially being subject to a rear-end collision, wherein the vehicle includes a safety belt associated with the vehicle seat and an electric reversible safety belt retractor associated with the safety belt, the method comprising:
  detecting and classifying collision risk for an approaching object using a rearward-looking detection system;
  monitoring one or more vehicle parameters using at least one sensor;
  determining a driving state as critical or non-critical from the one or more monitored vehicle parameters independent of the collision risk using a control unit; and
  controlling the electric reversible safety belt retractor to apply a predetermined pullback force on the safety belt to pull the occupant into the vehicle seat in response to the collision risk for an approaching object being classified as high within a predetermined time of an indicated critical driving state using the control unit.

13. The method of claim 10 wherein determining a driving state as critical or non-critical comprises determining the driving state as critical based on low wheel to road friction, significant vehicle deceleration, vehicle lane change, or strong vehicle turning.

14. The method of claim 10 wherein determining a driving state as critical or non-critical comprises determining the driving state as critical based on low wheel to road friction.

15. The method of claim 10 wherein determining a driving state as critical or non-critical comprises determining the driving state as critical based on significant vehicle deceleration.

16. The method of claim 10 wherein determining a driving state as critical or non-critical comprises determining the driving state as critical based on a vehicle lane change.

17. The method of claim 10 wherein determining a driving state as critical or non-critical comprises determining the driving state as critical based strong vehicle turning.

18. The method of claim 10 wherein detecting and classifying collision risk comprises estimating a time to collision and classifying the collision risk for an approaching object as high when the estimated time to collision falls below a predetermined threshold, wherein determining a driving state as critical or non-critical comprises determining the driving state as critical based on low wheel to road friction, significant vehicle deceleration, vehicle lane change, or strong vehicle turning, and wherein controlling the electric reversible safety belt retractor comprises the control unit controlling the electric reversible safety belt retractor to apply the predetermined pullback force on the safety belt to pull the occupant into the vehicle seat so as to properly position the occupant relative to the back rest of the vehicle seat after a high-risk maneuver has been performed and there exists a high risk of suffering a rear end collision.

19. A safety arrangement for a motor vehicle for positioning an occupant relative to a back rest of a vehicle seat and restraining the occupant thus positioned on the vehicle seat in preparation of the vehicle potentially being subject to a rear-end collision, wherein the vehicle includes a safety belt associated with the vehicle seat, an electric reversible safety belt retractor associated with the safety belt, and at least one sensor for monitoring one or more vehicle parameters, the arrangement comprising:
  a rearward-looking detection system for detecting and classifying collision risk for an approaching object; and
  a control unit configured to determine a driving state as critical or non-critical from the one or more monitored vehicle parameters independent of the collision risk, wherein the control unit further is operable to control the electric reversible safety belt retractor to apply a predetermined pullback force on the safety belt to pull the occupant into the vehicle seat in response to the collision risk for an approaching object being classified as high within a predetermined time of an indicated critical driving state.

20. The safety arrangement according to claim 11 wherein the control unit is configured to determine the driving state as critical based on low wheel to road friction, significant vehicle deceleration, vehicle lane change, or strong vehicle turning.

* * * * *

UNITED STATES PATENT AND TRADEMARK OFFICE
CERTIFICATE OF CORRECTION

PATENT NO. : 9,545,896 B2
APPLICATION NO. : 14/154491
DATED : January 17, 2017
INVENTOR(S) : Andrew Backhouse et al.

Page 1 of 2

It is certified that error appears in the above-identified patent and that said Letters Patent is hereby corrected as shown below:

In the Claims

Column 9, Line 42, Claim 13:
After "The method of claim"
Delete "10" and
Insert -- 12 --.

Column 9, Line 47, Claim 14:
After "The method of claim"
Delete "10" and
Insert --12 --.

Column 9, Line 51, Claim 15:
After "The method of claim"
Delete "10" and
Insert -- 12 --.

Column 10, Line 1, Claim 16:
After "The method of claim"
Delete "10" and
Insert -- 12 --.

Column 10, Line 5, Claim 17:
After "The method of claim"
Delete "10" and
Insert -- 12 --.

Signed and Sealed this
Sixteenth Day of May, 2017

Michelle K. Lee
*Director of the United States Patent and Trademark Office*

CERTIFICATE OF CORRECTION (continued)
U.S. Pat. No. 9,545,896 B2

Column 10, Line 7, Claim 17:
After "the driving state as critical based"
Insert -- on --.

Column 10, Line 48, Claim 20:
After "The safety arrangement according to claim"
Delete "11" and
Insert -- 19 --.